(12) United States Patent  
Ren et al.

(10) Patent No.: US 10,178,214 B2  
(45) Date of Patent: Jan. 8, 2019

(54) METHODS AND APPARATUSES FOR BINDING WITH DEVICE

(71) Applicant: Xiaomi Inc., Beijing (CN)

(72) Inventors: Qiao Ren, Beijing (CN); Yun Yang, Beijing (CN); Enxing Hou, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 15/066,808

(22) Filed: Mar. 10, 2016

(65) Prior Publication Data

US 2016/0269527 A1 Sep. 15, 2016

(30) Foreign Application Priority Data

Mar. 13, 2015 (CN) .......................... 2015 1 0112726

(51) Int. Cl.
*H04M 1/725* (2006.01)
*H04W 12/08* (2009.01)
(Continued)

(52) U.S. Cl.
CPC ........ *H04M 1/7253* (2013.01); *H04L 67/141* (2013.01); *H04W 8/20* (2013.01);
(Continued)

(58) Field of Classification Search
CPC ..... H04W 84/18; H04W 4/008; H04W 12/06; H04W 12/08; H04W 84/12; H04W 8/005;
(Continued)

(56) References Cited

U.S. PATENT DOCUMENTS

2006/0021017 A1  1/2006  Hinton et al.
2006/0288227 A1  12/2006  Kalofonos et al.
(Continued)

FOREIGN PATENT DOCUMENTS

CN    201421160 Y    3/2010
CN    101944996 A    1/2011
(Continued)

OTHER PUBLICATIONS

International Search Report dated Jan. 27, 2016 for International Application No. PCT/CN2015/093225, 4 pages.
(Continued)

*Primary Examiner* — George Eng
*Assistant Examiner* — Jing Gao
(74) *Attorney, Agent, or Firm* — Arch & Lake LLP

(57) ABSTRACT

A method and an apparatus are provided for binding with a device. The method includes: determining whether the device is connected to a designated wireless network; and when the device is connected to the designated wireless network, sending to a server a binding request for binding a user account with the device. The binding request carries the user account and is configured to trigger the server to start a binding process within a preset time period. The server establishes a binding relationship between the user account and the device when the server receives a binding confirmation message sent by the device within the preset time period.

20 Claims, 10 Drawing Sheets

(51) Int. Cl.
*H04W 8/20* (2009.01)
*H04W 12/06* (2009.01)
*H04W 60/04* (2009.01)
*H04L 29/08* (2006.01)

(52) U.S. Cl.
CPC .......... *H04W 12/06* (2013.01); *H04W 12/08* (2013.01); *H04W 60/04* (2013.01)

(58) Field of Classification Search
CPC ... H04W 8/18; H04W 76/045; H04W 76/023; H04W 60/04; H04W 76/025; H04W 8/22; H04W 84/20; H04W 8/20; H04M 1/7253; H04L 67/141
See application file for complete search history.

(56) References Cited

U.S. PATENT DOCUMENTS

| | | | |
|---|---|---|---|
| 2008/0034081 | A1 | 2/2008 | Marshall et al. |
| 2011/0293095 | A1 | 12/2011 | Ben Ayed |
| 2012/0019361 | A1 | 1/2012 | Ben Ayed |
| 2013/0176844 | A1* | 7/2013 | Xia ..................... H04W 48/16 370/221 |
| 2015/0304179 | A1* | 10/2015 | Huang ................... H04L 43/06 709/224 |
| 2015/0365512 | A1* | 12/2015 | MacKenzie ........... H04W 12/08 455/420 |

FOREIGN PATENT DOCUMENTS

| | | |
|---|---|---|
| CN | 102332127 A | 1/2012 |
| CN | 103176468 A | 6/2013 |
| CN | 103179636 A | 6/2013 |
| CN | 103399530 A | 11/2013 |
| CN | 103686674 A | 3/2014 |
| CN | 103914041 A | 7/2014 |
| CN | 104079543 A | 10/2014 |
| CN | 104202306 A * | 12/2014 ......... H04L 63/0853 |
| CN | 104243576 A | 12/2014 |
| CN | 104780154 A | 7/2015 |
| EP | 2224668 A1 | 9/2010 |
| EP | 2826269 A1 | 1/2015 |
| JP | 2012080482 A | 4/2012 |
| JP | 2015002543 A | 1/2015 |
| JP | 2015033085 A | 2/2015 |
| RU | 2439692 C2 | 1/2012 |
| WO | WO 2003046733 | 6/2003 |
| WO | 2008019334 A2 | 2/2008 |
| WO | 2015033594 A1 | 3/2015 |

OTHER PUBLICATIONS

Extended European Search Report in connection with EP 16 15 9503, dated Jun. 27, 2016, 6 pages.
International Search Report (English translation) in connnection with International Application No. PCT/CN2015/093225, dated Jan. 27, 2016, 2 pages.
Decision on Grant (including English translation) of Japanese Patent Application No. 2017-505704, dated Feb. 6, 2018, 5 pages.
Decision on Grant of Russian Patent Application No. 2016111615, dated May 2, 2017, 24 pages.
Office Action for Chinese Patent Application No. 201510112726.9 dated Jun. 233, 2017, 8 pages.
Office Action for Japanese Patent Application No. 2017-505704 dated Jul. 31, 2017, 3 pages.

* cited by examiner

# METHODS AND APPARATUSES FOR BINDING WITH DEVICE

CROSS-REFERENCE TO RELATED APPLICATIONS

The present application is based upon and claims priority to Chinese Patent Application No. 201510112726.9, filed Mar. 13, 2015, the entire contents of which are incorporated herein by reference.

TECHNICAL FIELD

The present disclosure generally relates to the field of communication, and more particularly, to methods and apparatuses for binding with a device.

BACKGROUND

Generally, a smart device may receive a user control command from a mobile phone after it is connected to a router, and then perform a corresponding operation. Moreover, for security purpose, sometimes a smart device is provided with binding mechanism for establishing a binding relationship between the smart device and a registered user account, and only the registered user account having a binding relationship may be considered as an owner of the smart device and may have operation and control permission to the device.

However, conventional binding mechanism is generally complicated, and tends to make mistakes in binding. Therefore, it is important to improve the security in binding with a smart device.

SUMMARY

According to a first aspect of embodiments of the present disclosure, there is provided a method for binding with a device. In the method, the terminal determines whether the device is connected to a designated wireless network. When the device is connected to the designated wireless network, the terminal sends to a server a binding request for binding a user account with the device. The binding request carries the user account and is configured to trigger the server to start a binding process within a preset time period, such that the server establishes a binding relationship between the user account and the device after the server receives a binding confirmation message sent by the device within the preset time period.

According to a second aspect of embodiments of the present disclosure, there is provided a method for binding with a device, which is applied in a server. The server receives a binding request sent by a terminal for binding with the device, where the binding request includes a user account for triggering the server to start a binding process within a preset time period. The server determines whether a binding confirmation message sent by the device is received within the preset time period. When a binding confirmation message sent by the device is received within the preset time period, establishing a binding relationship between the user account and the device.

According to a third aspect of embodiments of the present disclosure, there is provided an apparatus for binding a user account with a device. The apparatus may be a terminal including: a processor and a memory for storing instructions executable by the processor. The processor is configured to: determine whether the device is connected to a designated wireless network. When the device is connected to the designated wireless network, the processor sends to a server a binding request for binding the user account with the device. The binding request carries a user account and is configured to trigger the server to start a binding process within a preset time period, such that the server establishes a binding relationship between the user account and the device after the server receives a binding confirmation message sent by the device within the preset time period.

According to a fourth aspect of embodiments of the present disclosure, there is provided a server for binding with a device. The server includes: a processor; and a memory for storing instructions executable by the processor. The processor is configured to perform: receiving a binding request sent by a terminal for binding a user account with the device; the binding request carrying the user account for triggering the apparatus to start a binding process within a preset time period; determining whether a binding confirmation message sent by the device is received within the preset time period. When a binding confirmation message sent by the device is received within the preset time period, the server establishes a binding relationship between the user account and the device.

According to a fifth aspect of embodiments of the present disclosure, there is provided a non-transitory computer-readable storage medium storing instructions that, when being executed by a processor of a terminal, cause the terminal to perform: determining whether the device is connected to a designated wireless network; and when the device is connected to the designated wireless network, sending to a server a binding request for binding a user account with the device. The binding request carries the user account and is configured to trigger the server to start a binding process within a preset time period, such that the server establishes a binding relationship between the user account and the device after the server receives a binding confirmation message sent by the device within the preset time period.

According to a sixth aspect of embodiments of the present disclosure, there is provided a non-transitory computer-readable storage medium storing instructions that, when being executed by a processor of a server, cause the server to perform: receiving a binding request sent by a terminal for binding a user account with the device; the binding request carrying the user account for triggering the server to start a binding process within a preset time period; and determining whether a binding confirmation message sent by the device is received within the preset time period. When a binding confirmation message sent by the device is received within the preset time period, the server establishes a binding relationship between the user account and the device.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

The terms used herein are merely for describing a particular embodiment, rather than limiting the present disclosure. As used in the present disclosure and the appended claims, terms in singular form such as "a", "said" and "the" are intended to also include plural forms, unless explicitly dictated otherwise. It should also be understood that the term "and/or" used herein means any one or any possible combination of one or more associated listed items.

It should be understood that, although it may describe an element with a term first, second, or third, etc., the element is not limited by these terms. These terms are merely for distinguishing among elements of the same kind. For example, without departing from the scope of the present disclosure, a first element may also be referred to as a second element. Similarly, a second element may also be referred to as a first element. Depending on the text, a term "if" as used herein may be interpreted as "when", "where" or "in response to."

The present disclosure provides a method for binding a user account with a device, in which it is determined whether the to-be-bound device is connected to a designated wireless network; when the to-be-bound device is connected to the designated wireless network, it is sent to a server a binding request for binding with the to-be-bound device; where the binding request carries the user account and is configured to trigger the server to start a binding process within a preset time period, such that the server establishes a binding relationship between the user account and the to-be-bound device after the server receives a binding confirmation message sent by the to-be-bound device within the preset time period. Through the present disclosure, it may simplify the binding process, effectively avoid incorrect binding and thus improve the security in the device binding process.

Figure 1:
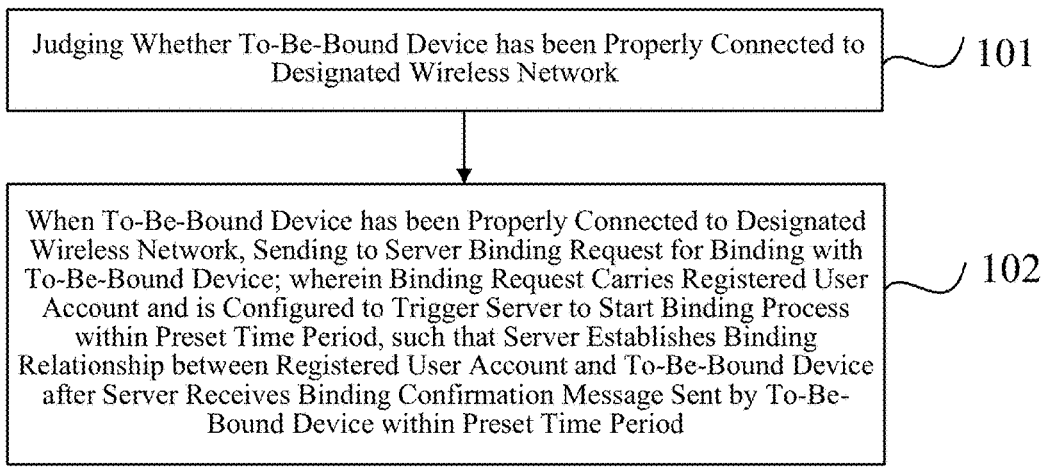
FIG. 1 is a flow chart showing a method for binding with a device according to an exemplary embodiment.

FIG. 1 is a flow chart showing a method for binding with a device according to an exemplary embodiment. The method may be implemented in a terminal. The method may include the following steps. The terminal may be a smart phone, a media player, a tablet, or other electronic device.

In step 101, the terminal determines whether the to-be-bound device is connected to a designated wireless network.

In step 102, when the to-be-bound device is connected to the designated wireless network, the terminal sends to a server a binding request for binding a user account with the to-be-bound device. The binding request carries the user account and is configured to trigger the server to start a binding process within a preset time period, such that the server establishes a binding relationship between the user account and the to-be-bound device after the server receives a binding confirmation message sent by the to-be-bound device within the preset time period. The user account may be a registered user account that is stored on the server and logged on by the user on the terminal.

In the disclosure, the terminal may be a smart terminal such as a smart mobile phone; the server may be a server device, a server cluster or a cloud platform; the to-be-bound device may be a smart device such as a smart home device; and the wireless network may be a WIFI network. Generally, a user controls a smart device with a smart terminal through a client program installed on the smart terminal. For example, in an implementation, the client program may be a "smart home" APP, and the user may centrally manage and control smart devices in a smart home environment through the APP.

In the following embodiment, for example, the client program is a smart home APP, and the technical solution of the present disclosure will be described with connection to the application scenario of a smart home environment.

Generally, a smart home environment may include a number of smart home devices. For example, a smart home environment may generally include smart home devices such as a smart camera, a smart socket, a smart air purifier and the like. The user may log in the smart home APP using a registered user account, establish a binding relationship to a smart device in the smart home environment, and acquire a permission to operate it.

Initially, when the smart device is powered on, the smart device may generally send, through a built-in WIFI module, to the surrounding a WIFI broadcast message carrying the name of the device. The smart home APP may scan the surrounding smart devices by receiving such WIFI broadcast message, and generate, in the interface of the APP, a device list containing the smart devices which are searched out, to facilitate the central management of the smart devices in the smart home environment. However, in an implementation, the smart home APP may scan the smart devices through a built-in Blue Tooth module. For example, after it is powered on, the smart device may send to the surrounding a Blue Tooth signal through a built-in Blue Tooth module, and the smart home APP may scan the surrounding smart devices by detecting such Blue Tooth signal sent by a smart device.

For a smart device that is searched out, since the smart device has not been connected to the network at this moment, the user may set the network configuration of the smart device through the smart home APP, to designate a WIFI network for the smart device to be connected to.

In an implementation, when it firstly searches out a new smart device, the smart home APP may present a prompt box "Found One Smart Device, Click to Immediately Connect New Device". When the user clicks a confirm button in the prompt box, the APP may turn to a device connecting interface.

The device connecting interface may provide a drop-down list of WIFI networks available for the smart device to be connected to, and a connection button. The user may designate a WIFI network (i.e., a router SSID) for the smart device to be connected to in the drop-down list. After he designates a WIFI network to which the smart device is to be connected, the user may click the connection button to initiate the connection of the smart device to the designated WIFI network. After the user clicks the connection button, an instruction for connecting to the designated WIFI network may be triggered and sent to the background. After it receives the instruction in the background, the smart home APP may immediately push the name and the password of the designated WIFI network to the smart device, and the smart device may be connected to the designated WIFI network based on the received name and password of the designated WIFI network.

Here, the implementation of the smart home APP pushing a WIFI name and a password to the smart device is not particularly limited in the disclosure. For example, in an implementation, the terminal installed with the smart home APP may scan the surrounding smart devices through a built-in WIFI module, and establish a WIFI connection with the searched-out smart device. After the WIFI connection is established, the name and the password of the WIFI network may be pushed to the searched-out smart device through the WIFI connection. In another implementation, the terminal installed with the smart home APP may encrypt the name and the password based on a preset algorithm, package the encrypted name and password of the WIFI network. Then, the package of the encrypted name and password of the WIFI network is carried by a WIFI broadcast message and sent to the surrounding smart device. However, in an implementation, the WIFI name and the password may be pushed to the smart device through a wireless router corresponding to the designated WIFI network, instead of the terminal installed with the smart home APP.

After it is properly connected to the designated WIFI network, the smart device may reply a notification message to the smart home APP for informing that the smart device is connected to the designated WIFI network. After it receives the notification message, the smart home APP may determine that the smart device is connected to the network. After the smart device is properly connected to the network, the user may initiate with a sever a binding with the smart device through the smart home APP, so as to obtain control permission to the smart device.

In the disclosure, when the smart home APP initiates with a sever a binding with the smart device, in order to simplify the binding process and improve the security of the binding, the smart home APP may provide a preset time period, for example 30 seconds, to require the user to press the binding confirmation button (e.g. an on/off button) on the smart device within the preset time period to confirm the binding. If the user performs the binding confirmation within the preset time period, a binding relationship with the smart device may be established.

In an implementation, after the smart device is properly connected to the designated WIFI network, the smart home APP may immediately send to the server a binding request for binding with the smart device; and the binding request may carry the registered account with which the user may log in the smart home APP and a unique identification (e.g. a device name) of the smart device. Here, in an implementation, the binding request may be configured to trigger the server to start the binding process within the preset time period. For example, it is assumed that the preset time period is 30 seconds, the binding request may be configured to trigger the server to start the binding process with the smart device within 30 seconds since the server receives the binding request, such that a binding relationship with the smart device may be established within 30 seconds. Thereby, it may improve the security.

After it sends a binding request to the server, the smart home APP may present a prompt interface to the user for prompting the user to press a designated binding confirmation button within the preset time period. For example, it is assumed that the preset time period is 30 second and the binding confirmation button is an on/off button of the smart device, the smart home APP may present a prompt box "Please Click On/Off Button within 30 Seconds to Complete Connection" to the user.

After the user, prompted by the above prompt interface, press the binding confirmation button within the preset time period, the smart device may be triggered to send a binding confirmation message with respect to the current binding; and the binding confirmation message may carry the unique identification of the smart device.

Meanwhile, after it receives the binding request sent by the smart home APP, the server may start time counting and start a binding process with respect to the smart device. After it starts the binding process with respect to the smart device, the server may start to receive the binding confirmation message sent by the smart device.

For the received binding confirmation message, the server may compare the unique identification in the binding confirmation message with the unique identification in the binding request. If the unique identification in the received binding confirmation message is identical to the unique identification in the binding request, it means that the server receives a binding confirmation message replied by the smart device associated with the current binding process and the server may directly establish a corresponding relationship locally between the smart device and the registered user account in the binding request, and send a notification message to the smart home APP for informing a properly established binding.

After the binding is properly established, the registered user account obtains control permission to the smart device. Then, the user may log in the smart home APP with the registered user account to control and operate the smart device. Moreover, once the binding is properly established, when the smart device is reset, the binding will no longer be requested, since after the reset, the device is still in the device list of the smart home APP interface.

However, if the binding confirmation message received by the server within the preset time period contains a unique identification different from the unique identification in the binding request, it is considered a failure in the local binding, and the server may return a notification message to the smart home APP for informing a failure in the binding.

After it receives the notification sent from the server for informing a properly established binding, the smart home APP may present a prompt message to the user for informing a properly established binding in the APP interface. After it receives the notification sent from the server for informing a failure in binding, the smart home APP may present, in the generated device list in the APP interface at a position corresponding to the smart device, an option for the user to prompt the user to bind with the to-be-bound device for another time. For example, an option "connect for another time" may be presented behind the name of the smart device in the device list, for the user to conveniently initiate another binding with the smart device through the smart home APP.

In one or more embodiments, it is determined whether the to-be-bound device is connected to a designated wireless network; when the to-be-bound device is connected to the designated wireless network, it is sent to a server a binding request for binding with the to-be-bound device; where the binding request carries a registered user account and is configured to trigger the server to start a binding process within a preset time period, such that the server establishes a binding relationship between the registered user account and the to-be-bound device after the server receives a binding confirmation message sent by the to-be-bound device within the preset time period.

Accordingly, the present disclosure provides binding confirmation mechanism and a concept of binding confirmation time limit. If a binding confirmation is performed within the binding confirmation time limit, it is considered the binding may be properly established; and if a binding confirmation is not performed within the binding confirmation time limit, it is considered the binding fails. Thereby, it may eliminate a complex binding verifying process and thus simplify the binding process. Moreover, since the binding confirmation is triggered by a user manually pressing a binding confirmation button, it may effectively avoid incorrect binding and thus improve the security in the device binding process.

Figure 2:
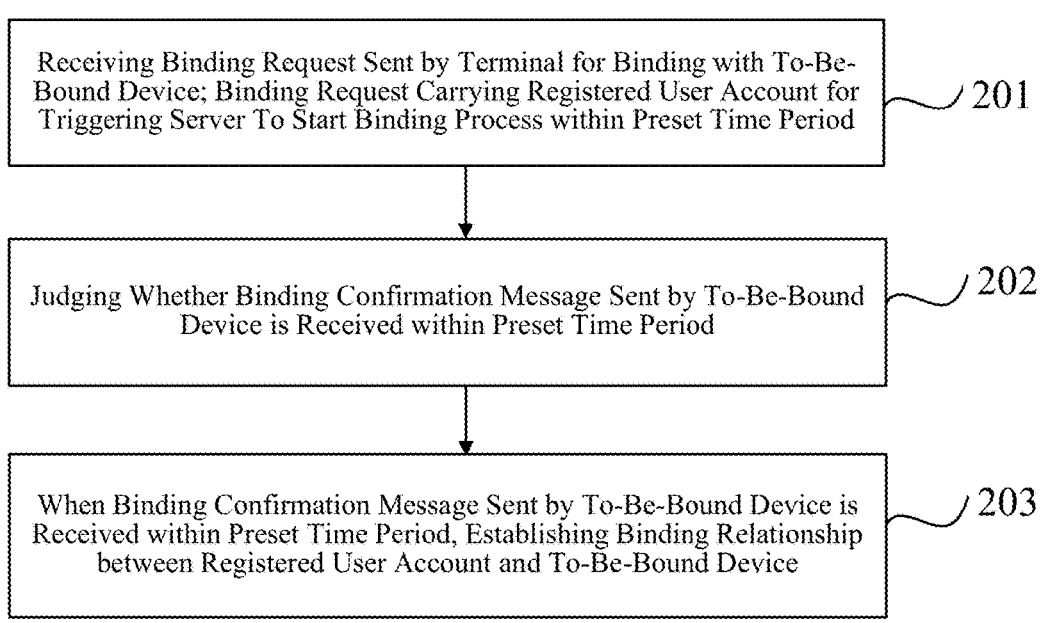
FIG. 2 is a flow chart showing another method for binding with a device according to an exemplary embodiment.

FIG. 2 is a flow chart showing a method for binding with a device according to an exemplary embodiment. The method may be implemented in a server and may include the following steps.

In step 201, the server receives a binding request sent by a terminal for binding a user account with the to-be-bound device is received; the binding request carrying the user account for triggering the server to start a binding process within a preset time period.

In step 202, the server determines whether a binding confirmation message sent by the to-be-bound device is received within the preset time period.

In step 203, when a binding confirmation message sent by the to-be-bound device is received within the preset time period, the server establishes a binding relationship between the registered user account and the to-be-bound device.

In the disclosure, the terminal may be a smart terminal such as a smart mobile phone; the server may be a server device, a server cluster or a cloud platform; the to-be-bound device may be a smart device such as a smart home device; and the wireless network may be a WIFI network. Generally, a user controls a smart device with a smart terminal through a client program installed on the smart terminal. For example, in an implementation, the client program may be a "smart home" APP, and the user may centrally manage and control smart devices in a smart home environment through the APP.

In the following embodiment, for example, the client program is a smart home APP, and the technical solution of the present disclosure will be described with connection to the application scenario of a smart home environment.

Generally, a smart home environment may include a number of smart home devices. For example, a smart home environment may generally include smart home devices such as a smart camera, a smart socket, a smart air purifier and the like. The user may log in the smart home APP using a registered user account, establish a binding relationship to a smart device in the smart home environment, and acquire a permission to operate it.

Initially, when the smart device is powered on, the smart device may generally send, through a built-in WIFI module, to the surrounding a WIFI broadcast message carrying the name of the device. The smart home APP may scan the surrounding smart devices by receiving such WIFI broadcast message, and generate, in the interface of the APP, a device list containing the smart devices which are searched out, to facilitate the central management and control of the smart devices in the smart home environment. However, in an implementation, the smart home APP may scan the smart devices through a built-in Blue Tooth module. For example, after it is powered on, the smart device may send to the surrounding a Blue Tooth signal through a built-in Blue Tooth module, and the smart home APP may scan the surrounding smart devices by detecting such Blue Tooth signal sent by a smart device.

For a smart device that is searched out, since the smart device has not been connected to the network at this moment, the user may set the network configuration of the smart device through the smart home APP, to designate a WIFI network for the smart device to be connected to.

In an implementation, when it firstly searches out a new smart device, the smart home APP may present a prompt box "Found One Smart Device, Click to Immediately Connect New Device". When the user clicks a confirm button in the prompt box, the APP turns to a device connecting interface.

The device connecting interface may provide a drop-down list of WIFI networks available for the smart device to be connected to. The user may designate a WIFI network for the smart device to be connected to in the drop-down list. After he designates a WIFI network to which the smart device is to be connected, the user may click a connection button to initiate the connection of the smart device to the designated WIFI network. After the user clicks the connection button, an instruction for connecting to the designated WIFI network may be triggered and sent to the background. After it receives the instruction in the background, the smart home APP may immediately push the name and the password of the designated WIFI network to the smart device, and the smart device may be connected to the designated WIFI network based on the received name and password of the designated WIFI network.

Here, the implementation of the smart home APP pushing a WIFI name and a password to the smart device is not particularly limited in the disclosure. For example, in an implementation, the terminal installed with the smart home APP may scan the surrounding smart devices through a built-in WIFI module, and establish a WIFI connection with the searched-out smart device. After the WIFI connection is established, the name and the password of the WIFI network may be pushed to the searched-out smart device through the WIFI connection. In another implementation, the terminal installed with the smart home APP may encrypt the name and the password based on a preset algorithm, package the encrypted name and password of the WIFI network. Then, the package of the encrypted name and password of the WIFI network is carried by a WIFI broadcast message and sent to the surrounding smart device. However, in an implementation, the WIFI name and the password may be pushed to the smart device through a wireless router corresponding to the designated WIFI network, instead of the terminal installed with the smart home APP.

After it is properly connected to the designated WIFI network, the smart device may reply a notification message to the smart home APP for informing that the smart device is connected to the designated WIFI network. After it receives the notification message, the smart home APP may determine that the smart device is connected to the network. After the smart device is properly connected to the network, the user may initiate with a sever a binding with the smart device through the smart home APP, so as to obtain control permission to the smart device.

In the disclosure, when the smart home APP initiates with a sever a binding with the smart device, in order to simplify the binding process and improve the security of the binding, the smart home APP may provide a preset time period, for example 30 seconds, to require the user to press a binding confirmation button (e.g. an on/off button) on the smart device within the preset time period to confirm the binding. If the user performs the binding confirmation within the preset time period, a binding relationship with the smart device may be established.

In an implementation, after the smart device is properly connected to the designated WIFI network, the smart home APP may immediately send to the server a binding request for binding with the smart device; and the binding request may carry the registered account with which the user may log in the smart home APP and a unique identification (e.g. a device name) of the smart device. Here, in an implementation, the binding request may be configured to trigger the server to start the binding process within the preset time period. For example, it is assumed that the preset time period is 30 seconds, the binding request may be configured to trigger the server to start the binding process with the smart device within 30 seconds since the server receives the binding request, such that a binding relationship with the smart device may be established within 30 seconds. Thereby, it may improve the security.

After the terminal sends a binding request to the server, the smart home APP may present a prompt interface in the terminal to the user for prompting the user to press a designated binding confirmation button within the preset time period. For example, it is assumed that the preset time period is 30 second and the binding confirmation button is an on/off button of the smart device, the smart home APP may present a prompt box "Please Click On/Off Button within 30 Seconds to Complete Connection" to the user.

After the user presses the binding confirmation button within the preset time period in the above prompt interface, the smart device may be triggered to send a binding confirmation message with respect to the current binding; and the binding confirmation message may carry the unique identification of the smart device.

Meanwhile, after receiving the binding request sent by the smart home APP, the server may start time counting and start a binding process with respect to the smart device. After it starts the binding process with respect to the smart device, the server may start to receive the binding confirmation message sent by the smart device.

For the received binding confirmation message, the server may compare the unique identification in the binding confirmation message with the unique identification in the binding request. If the unique identification in the received binding confirmation message is identical to the unique identification in the binding request, it means that the server receives a binding confirmation message replied by the smart device associated with the current binding process and the server may directly establish a corresponding relationship locally between the smart device and the registered user account in the binding request, and send a notification message to the smart home APP for informing a properly established binding. After the binding is properly established, the registered user account obtains control permission to the smart device. Then, the user may log in the smart home APP with the registered user account to control and operate the smart device. Moreover, once the binding is properly established, when the smart device is reset, the binding will no longer be requested, since after the reset, the device is still in the device list of the smart home APP interface. However, if the binding confirmation message received by the server within the preset time period contains a unique identification different from the unique identification in the binding request, it is considered a failure in the local binding, and the server may return a notification message to the smart home APP for informing a failure in the binding.

After the terminal receives the notification sent from the server for informing a properly established binding, the smart home APP may present a prompt message to the user for informing a properly established binding in the APP interface. After it receives the notification sent from the server for informing a failure in binding, the smart home APP may present, in the generated device list in the APP interface at a position corresponding to the smart device, an option for the user to prompt the user to bind with the to-be-bound device for another time. For example, an option "Connect for Another Time" may be presented behind the name of the smart device in the device list, for the user to conveniently initiate another binding with the smart device through the smart home APP.

In one or more embodiments, it is determined whether the to-be-bound device is connected to a designated wireless network; when the to-be-bound device is connected to the designated wireless network, it is sent to a server a binding request for binding with the to-be-bound device; where the binding request carries a registered user account and is configured to trigger the server to start a binding process within a preset time period, such that the server establishes a binding relationship between the registered user account and the to-be-bound device after the server receives a binding confirmation message sent by the to-be-bound device within the preset time period.

Accordingly, the present disclosure provides binding confirmation mechanism and a concept of binding confirmation time limit. If a binding confirmation is performed within the binding confirmation time limit, it is considered the binding may be properly established; and if a binding confirmation is not performed within the binding confirmation time limit, it is considered the binding fails. Thereby, it may eliminate a complex binding verifying process and thus simplify the binding process. Moreover, since the binding confirmation is triggered by a user manually pressing a binding confirmation button, it may effectively avoid incorrect binding and thus improve the security in the device binding process.

Figure 3:
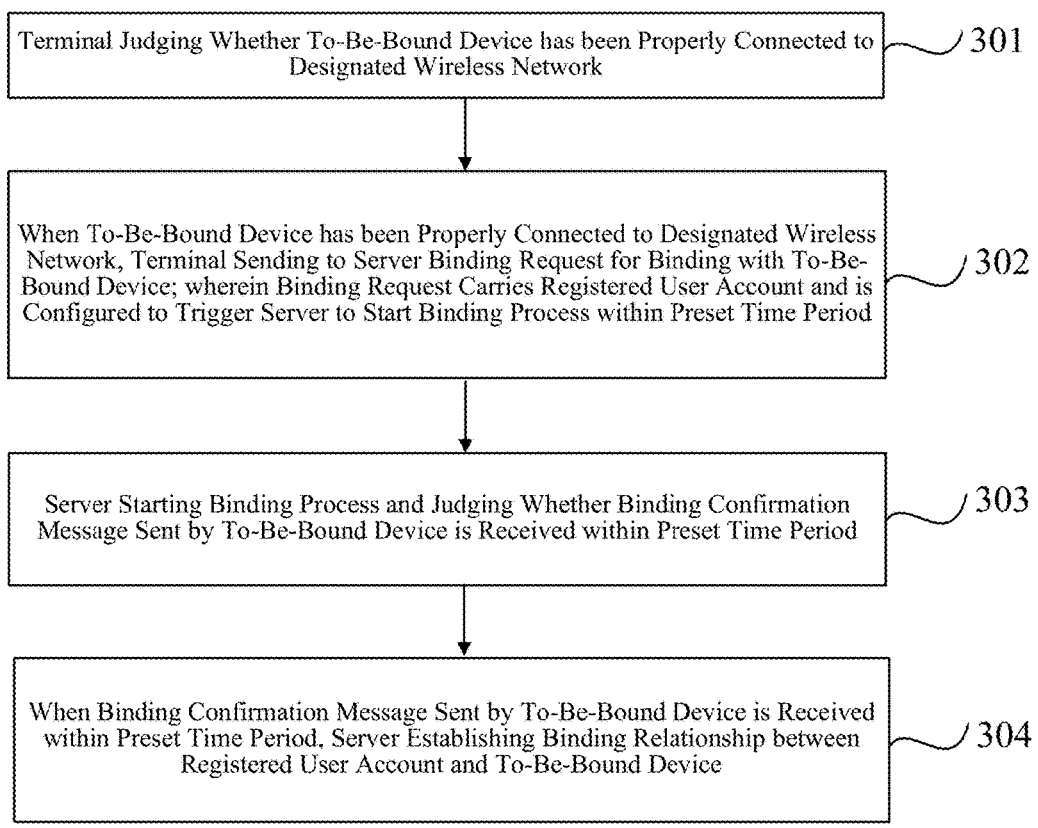
FIG. 3 is a flow chart showing another method for binding with a device according to an exemplary embodiment.

FIG. 3 is a flow chart showing a method for binding with a device according to an exemplary embodiment, including the following steps.

In step 301, a terminal determines whether the to-be-bound device is connected to a designated wireless network.

In step 302, when the to-be-bound device is connected to the designated wireless network, the terminal sends to a server a binding request for binding a user account with the to-be-bound device; where the binding request carries the user account and is configured to trigger the server to start a binding process within a preset time period.

In step 303, the server starts a binding process and determines whether a binding confirmation message sent by the to-be-bound device is received within the preset time period.

In step 304, when a binding confirmation message sent by the to-be-bound device is received within the preset time period, the server establishes a binding relationship between the user account and the to-be-bound device. The user account may be a registered user account.

In the disclosure, the terminal may be a smart terminal such as a smart mobile phone; the server may be a server device, a server cluster or a cloud platform; the to-be-bound device may be a smart device such as a smart home device; and the wireless network may be a WIFI network. Generally, a user controls a smart device with a smart terminal through a client program installed on the smart terminal. For example, in an implementation, the client program may be a "smart home" APP, and the user may centrally manage and control smart devices in a smart home environment through the APP.

In the following embodiment, for example, the client program is a smart home APP, and the technical solution of the present disclosure will be described with connection to the application scenario of a smart home environment.

Generally, a smart home environment may include a number of smart home devices. For example, a smart home environment may generally include smart home devices such as a smart camera, a smart socket, a smart air purifier and the like. The user may log in the smart home APP using a registered user account, establish a binding relationship to a smart device in the smart home environment, and acquire a permission to operate it.

Initially, when the smart device is powered on, the smart device may generally send, through a built-in WIFI module, to the surrounding a WIFI broadcast message carrying the name of the device. The smart home APP may scan the surrounding smart devices by receiving such WIFI broadcast message, and generate, in the interface of the APP, a device list containing the smart devices which are searched out, to facilitate the central management and control of the smart devices in the smart home environment. However, in an implementation, the smart home APP may scan the smart devices through a built-in Blue Tooth module. For example, after it is powered on, the smart device may send to the surrounding a Blue Tooth signal through a built-in Blue Tooth module, and the smart home APP may scan the surrounding smart devices by detecting such Blue Tooth signal sent by a smart device.

For a smart device that is searched out, since the smart device has not been connected to the network at this moment, the user may set the network configuration of the smart device through the smart home APP, to designate a WIFI network for the smart device to be connected to.

Figure 4:
FIG. 4 is a schematic diagram showing an interface of a smart home APP according to an exemplary embodiment.

Referring to FIG. 4, in an implementation, when it firstly searches out a new smart device (for example, an air purifier), the smart home APP may present a prompt box "Found One Smart Device, Click to Immediately Connect New Device". When the user clicks a confirm button in the prompt box, the APP turns to a device connecting interface.

Figure 5:
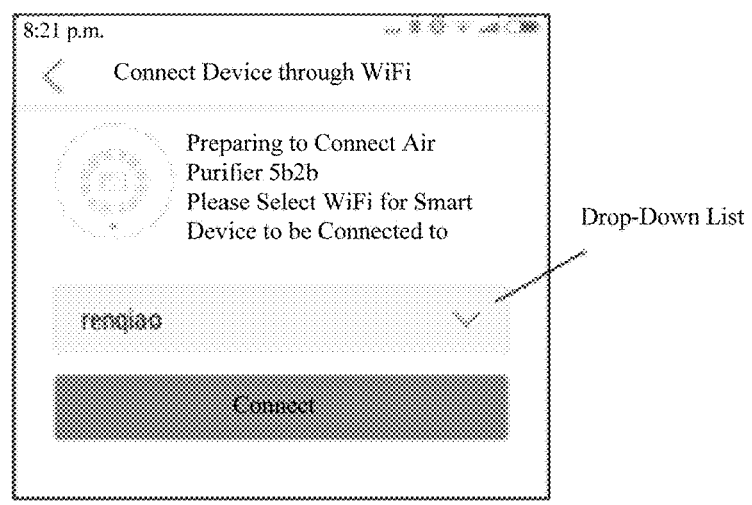
FIG. 5 is a schematic diagram showing another interface of a smart home APP according to an exemplary embodiment.

Referring to FIG. 5, The device connecting interface may provide a drop-down list of WIFI networks available for the smart device (for example, an air purifier) to be connected to, and a connection button. The user may designate a WIFI network for the smart device to be connected to in the drop-down list (i.e., a router SSID). After he designates a WIFI network to which the smart device is to be connected, the user may click a connection button to initiate the connection of the smart device to the designated WIFI network. After the user clicks the connection button, an instruction for connecting to the designated WIFI network may be triggered and sent to the background. After it receives the instruction in the background, the smart home APP may immediately push the name and the password of the designated WIFI network to the smart device, and the smart device may be connected to the designated WIFI network based on the received name and password of the designated WIFI network.

Here, the implementation of the smart home APP pushing a WIFI name and a password to the smart device is not particularly limited in the disclosure. For example, in an implementation, the terminal installed with the smart home APP may scan the surrounding smart devices through a built-in WIFI module, and establish a WIFI connection with the searched-out smart device. After the WIFI connection is connected, the name and the password of the WIFI network may be pushed to the searched-out smart device through the WIFI connection. In another implementation, the terminal installed with the smart home APP may encrypt the name and the password based on a preset algorithm, package the encrypted name and password of the WIFI network. Then, the package of the encrypted name and password of the WIFI network is carried by a WIFI broadcast message and sent to the surrounding smart device. However, in an implementation, the WIFI name and the password may be pushed to the smart device through a wireless router corresponding to the designated WIFI network, instead of the terminal installed with the smart home APP.

Figure 6:
FIG. 6 is a schematic diagram showing another interface of a smart home APP according to an exemplary embodiment.

After it is properly connected to the designated WIFI network, the smart device may reply a notification message to the smart home APP for informing that the smart device is connected to the designated WIFI network. After it receives the notification message, the smart home APP may determine that the smart device is connected to the network. After the smart device is properly connected to the network, a notice may also be presented to the user in the interface of the smart home APP to inform the user. For example, as shown in FIG. 6, the smart device is for example an air purifier, and a notice "Congratulation, Air Purifier is connected" may be presented in the interface of the smart home APP to the user.

After the smart device is properly connected to the network, the user may initiate with a sever a binding with the smart device through the smart home APP, so as to obtain control permission to the smart device.

In the disclosure, when the smart home APP initiates with a sever a binding with the smart device, in order to simplify the binding process and improve the security of the binding, the smart home APP may provide a preset time period, for example 30 seconds, to require the user to press the binding confirmation button (e.g. an on/off button) on the smart device within the preset time period to confirm the binding. If the user performs the binding confirmation within the preset time period, a binding relationship with the smart device may be established.

In an implementation, after the smart device is properly connected to the designated WIFI network, the smart home APP may send to the server a binding request for binding with the smart device; and the binding request may carry the registered account with which the user may log in the smart home APP and a unique identification (e.g. a device name) of the smart device. Here, in one or more implementations, the binding request may be configured to trigger the server to start the binding process within the preset time period. For example, it is assumed that the preset time period is 30 seconds, the binding request may be configured to trigger the server to start the binding process with the smart device within 30 seconds since the server receives the binding request, such that a binding relationship with the smart device may be established within 30 seconds. Thereby, it may improve the security.

Figure 7:
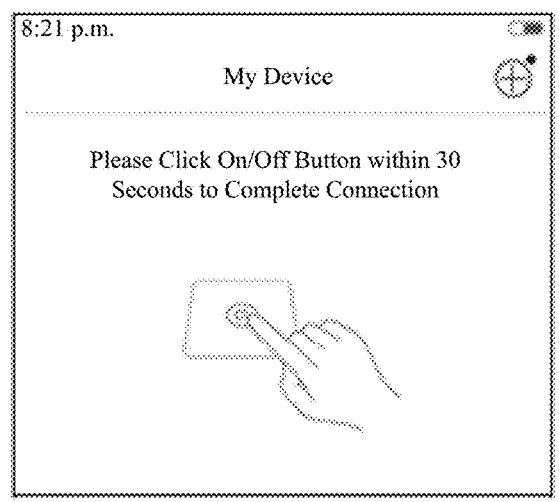
FIG. 7 is a schematic diagram showing another interface of a smart home APP according to an exemplary embodiment.

After the terminal sends a binding request to the server, the smart home APP may present a prompt interface to the user for prompting the user to press a designated binding confirmation button within the preset time period. For example, as shown in FIG. 7, it is assumed that the preset time period is 30 second and the binding confirmation button is an on/off button of the smart device, the smart home APP may present a prompt box "Please Click On/Off Button within 30 Seconds to Complete Connection" to the user.

After the user presses the binding confirmation button within the preset time period in the above prompt interface, the smart device may be triggered to send a binding confirmation message with respect to the current binding; and the binding confirmation message may carry the unique identification of the smart device.

Meanwhile, after it receives the binding request sent by the smart home APP, the server may start time counting and start a binding process with respect to the smart device. After it starts the binding process with respect to the smart device, the server may start to receive the binding confirmation message sent by the smart device.

For the received binding confirmation message, the server may compare the unique identification in the binding confirmation message with the unique identification in the binding request. If the unique identification in the received binding confirmation message is identical to the unique identification in the binding request, it means that the server receives a binding confirmation message replied by the smart device associated with the current binding process and the server may directly establish a corresponding relationship locally between the smart device and the registered user account in the binding request, and send a notification message to the smart home APP for informing a properly established binding.

After the binding is properly established, the registered user account obtains control permission to the smart device. Then, the user may log in the smart home APP with the registered user account to control and operate the smart device. Moreover, once the binding is properly established, when the smart device is reset, the binding will no longer be requested, since after the reset, the device is still in the device list of the smart home APP interface. However, if the binding confirmation message received by the server within the preset time period contains a unique identification different from the unique identification in the binding request, it is considered a failure in the local binding, and the server may return a notification message to the smart home APP for informing a failure in the binding.

After the terminal receives the notification sent from the server for informing a properly established binding, the smart home APP may present a prompt message to the user for informing a properly established binding in the APP interface. After it receives the notification sent from the server for informing a failure in binding, the smart home APP may present, in the generated device list in the APP interface at a position corresponding to the smart device, an option for the user to prompt the user to bind with the to-be-bound device for another time. For example, an option "connect for another time" may be presented behind the name of the smart device in the device list, for the user to conveniently initiate another binding with the smart device through the smart home APP.

In one or more embodiments, it is determined whether the to-be-bound device is connected to a designated wireless network; when the to-be-bound device is connected to the designated wireless network, it is sent to a server a binding request for binding with the to-be-bound device; where the binding request carries a registered user account and is configured to trigger the server to start a binding process within a preset time period, such that the server establishes a binding relationship between the registered user account and the to-be-bound device after the server receives a binding confirmation message sent by the to-be-bound device within the preset time period.

Accordingly, the present disclosure provides binding confirmation mechanism and a concept of binding confirmation time limit. If a binding confirmation is performed within the binding confirmation time limit, it is considered the binding may be properly established; and if a binding confirmation is not performed within the binding confirmation time limit, it is considered the binding fails. Thereby, it may eliminate a complex binding verifying process and thus simplify the binding process. Moreover, since the binding confirmation is triggered by a user manually pressing a binding confirmation button, it may effectively avoid incorrect binding and thus improve the security in the device binding process.

Corresponding to one or more embodiments of methods for binding with a device, the present disclosure provides embodiments of apparatuses.

Figure 8:
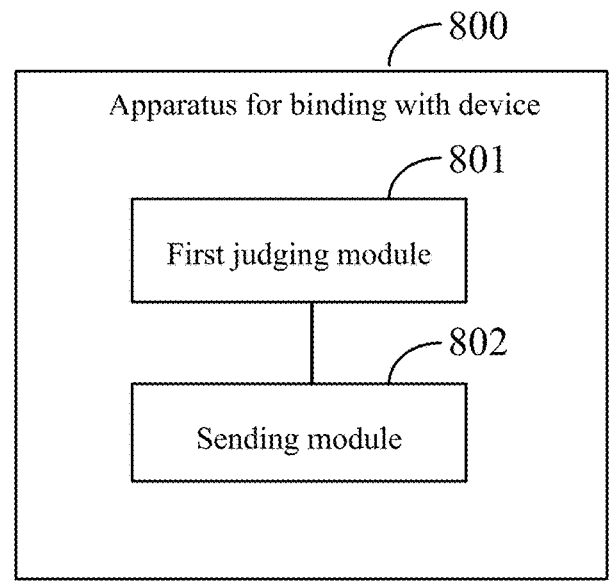
FIG. 8 is a block diagram illustrating an apparatus for binding with a device according to an exemplary embodiment.

FIG. 8 is a block diagram illustrating an apparatus for binding with a device according to an exemplary embodiment.

As shown in FIG. 8 is an apparatus 800 for binding with a device according to an exemplary embodiment, including: a first determining module 801 and a sending module 802; where the first determining module 801 is configured to determine whether the to-be-bound device is connected to a designated wireless network. The sending module 802 is configured to, when the to-be-bound device is connected to the designated wireless network, send to a server a binding request for binding with the to-be-bound device; where the binding request carries a registered user account and is configured to trigger the server to start a binding process within a preset time period, such that the server establishes a binding relationship between the registered user account and the to-be-bound device after the server receives a binding confirmation message sent by the to-be-bound device within the preset time period.

In one or more embodiments, it is determined whether the to-be-bound device is connected to a designated wireless network; when the to-be-bound device is connected to the designated wireless network, it is sent to a server a binding request for binding with the to-be-bound device; where the binding request carries a registered user account and is configured to trigger the server to start a binding process within a preset time period, such that the server establishes a binding relationship between the registered user account and the to-be-bound device after the server receives a binding confirmation message sent by the to-be-bound device within the preset time period. Through the present disclosure, it may simplify the binding process, effectively avoid incorrect binding and thus improve the security in the device binding process.

Figure 9:
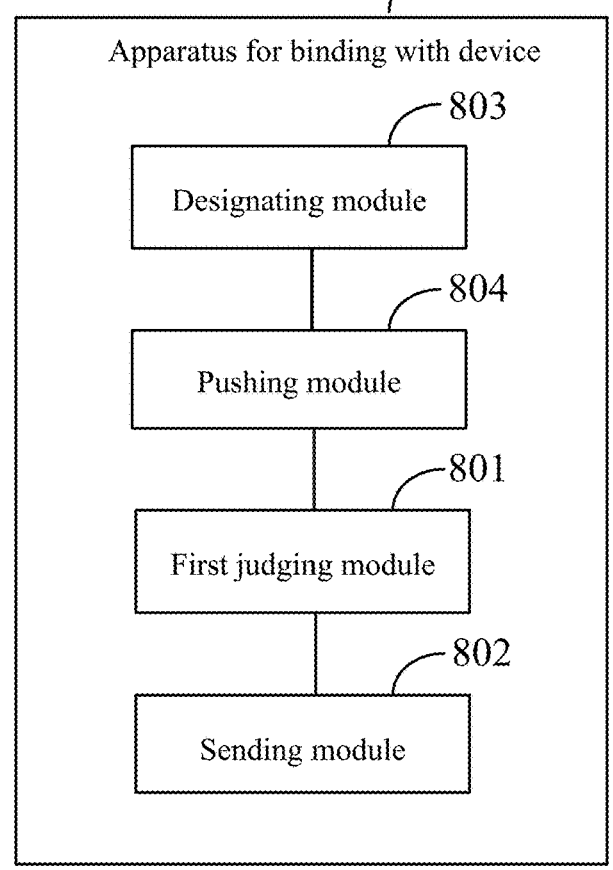
FIG. 9 is a block diagram illustrating another apparatus for binding with a device according to an exemplary embodiment.

FIG. 9 is a block diagram illustrating another apparatus for binding with a device according to an exemplary embodiment, based on the embodiment as shown in the above FIG. 8. The apparatus 800 may further include a designating module 803 and a pushing module 804. The designating module 803 is configured to, before the first determining module determines whether the to-be-bound device is connected to the designated wireless network, designate a wireless network for the to-be-bound device based on user setting. The pushing module 804 is configured to, when an instruction for establishing a connection with the wireless network is received, push a name and a password of the wireless network to the to-be-bound device.

Figure 10:
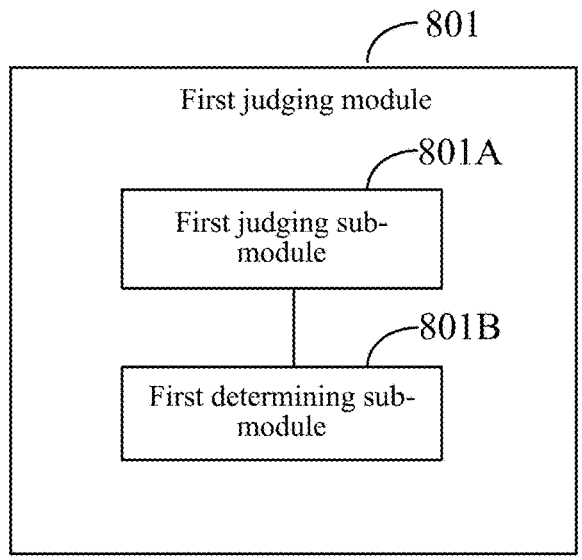
FIG. 10 is a block diagram illustrating another apparatus for binding with a device according to an exemplary embodiment.

FIG. 10 is a block diagram illustrating another apparatus for binding with a device according to an exemplary embodiment, based on the embodiment as shown in the above FIG. 8. The first determining module 801 may further include a first determining sub-module 801A and a first determining sub-module 801B. The first determining sub-module 801A is configured to determine whether a notification message is received for informing that the to-be-bound device is connected to the designated wireless network. The first determining sub-module 801B is configured to, when a notification message is received for informing that the to-be-bound device is connected to the designated wireless network, determine that the to-be-bound device is connected to the designated wireless network.

It should be noted that, the first determining sub-module 801A and the first determining sub-module 801B above as shown in FIG. 10 may also be included in the apparatus according to one or more embodiments as shown in FIG. 9. This is not limited in the present disclosure.

Figure 11:
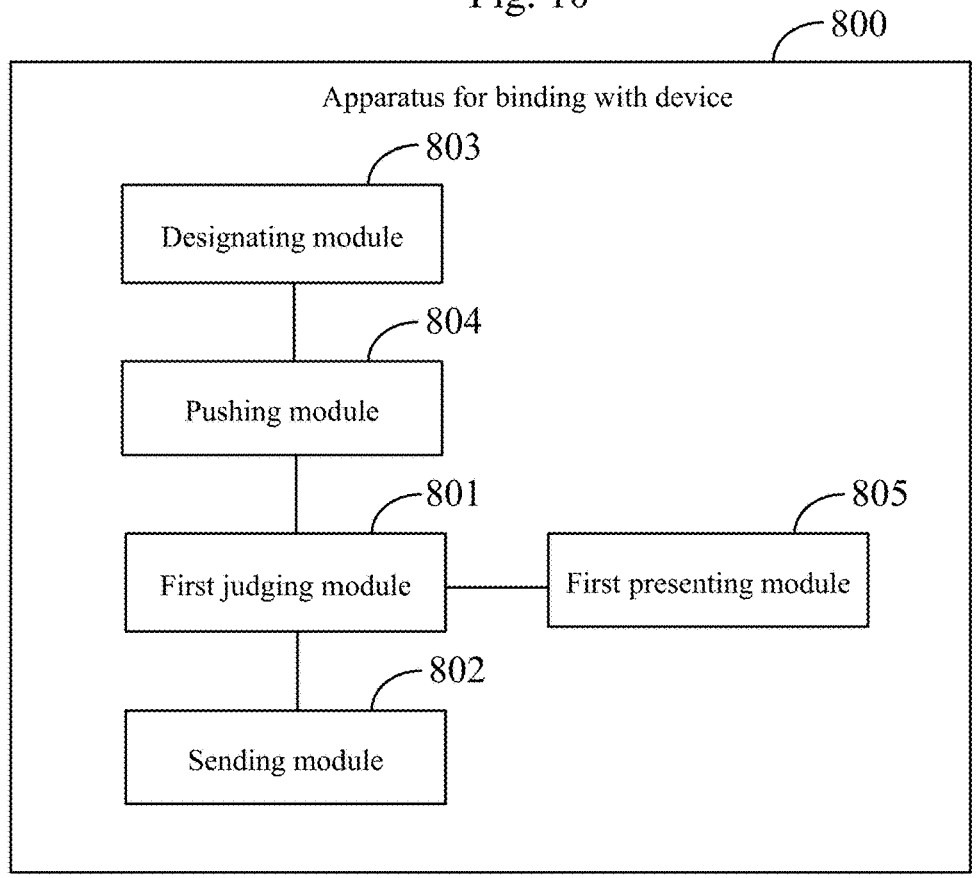
FIG. 11 is a block diagram illustrating another apparatus for binding with a device according to an exemplary embodiment.

FIG. 11 is a block diagram illustrating another apparatus for binding with a device according to an exemplary embodiment, based on the embodiment as shown in the above FIG. 8. The apparatus 800 may further include a first presenting module 805; where the first presenting module 805 is configured to, when the to-be-bound device is properly connected to the designated network, present a prompt message for prompting a user to press a binding confirmation button within the preset time period; where after the binding confirmation button is pressed, the to-be-bound device is triggered to send a binding confirmation message to the server.

It should be noted that, the first presenting module 805 above as shown in FIG. 11 may also be included in the apparatus according to one or more embodiments as shown in FIGS. 9-10. This is not limited in the present disclosure.

Figure 12:
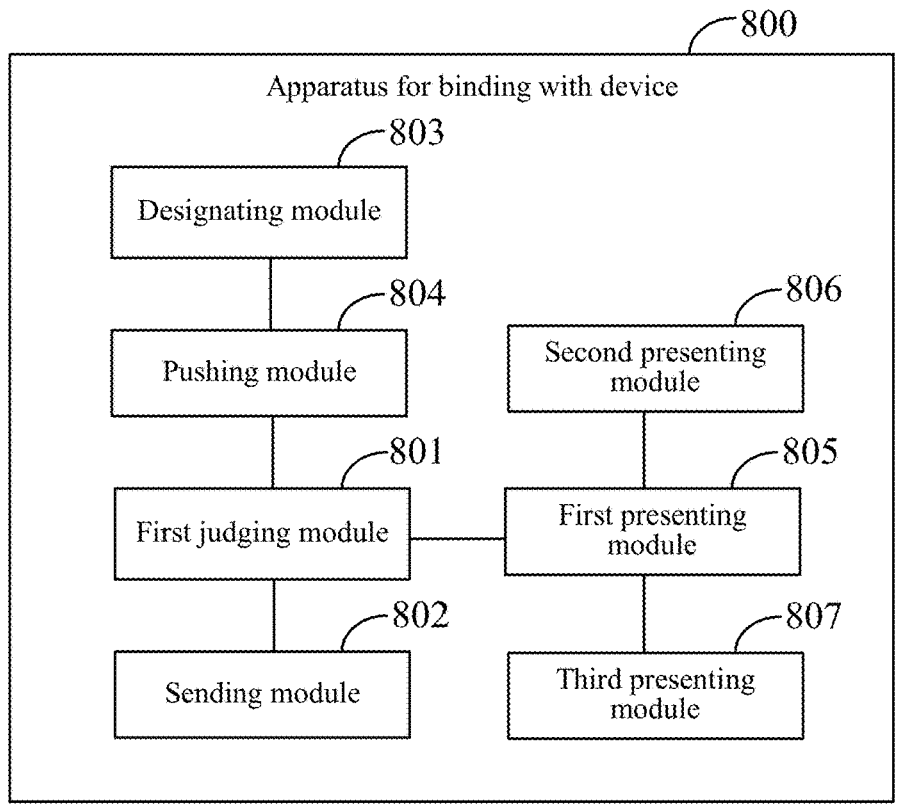
FIG. 12 is a block diagram illustrating another apparatus for binding with a device according to an exemplary embodiment.

FIG. 12 is a block diagram illustrating another apparatus for binding with a device according to an exemplary embodiment, based on the embodiment as shown in the above FIG. 8. The apparatus 800 may further include a second presenting module 806 and a third presenting module 807. The second presenting module 806 is configured to, when a notification message sent by the server for informing that the registered user account has been properly bound with the to-be-bound device is received, present a prompt message to a user for informing that the binding has been properly established. The third presenting module 807 is configured to, when a notification message sent by the server for informing that the registered user account fails to be bound with the to-be-bound device is received, present, in a preset device-list interface at a position corresponding to the to-be-bound device, an option for the user to prompt the user to bind with the to-be-bound device for another time.

It should be noted that, the second presenting module 806 and the third presenting module 807 above as shown in FIG. 12 may also be included in the apparatus according to one or more embodiments as shown in FIGS. 9-11. This is not limited in the present disclosure.

Figure 13:
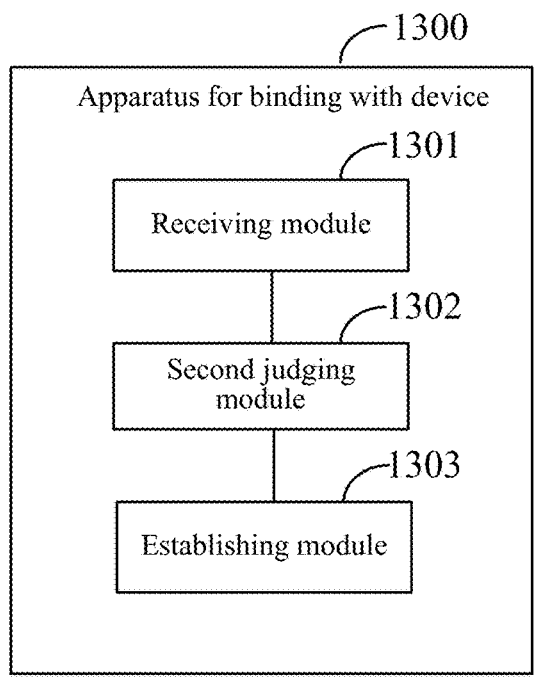
FIG. 13 is a block diagram illustrating another apparatus for binding with a device according to an exemplary embodiment.

FIG. 13 is a block diagram illustrating another apparatus for binding with a device according to an exemplary embodiment.

As shown in FIG. 13 is an apparatus 1300 for binding with a device according to an exemplary embodiment, including: a receiving module 1301, a second determining module 1302 and an establishing module 1303. The receiving module 1301 is configured to receive a binding request sent by a terminal for binding with the to-be-bound device; the binding request carrying a registered user account for triggering the apparatus to start a binding process within a preset time period. The second determining module 1302 is configured to determine whether a binding confirmation message sent by the to-be-bound device is received within the preset time period. The establishing module 1303 is configured to, when a binding confirmation message sent by the to-be-bound device is received within the preset time period, establish a binding relationship between the registered user account and the to-be-bound device.

In one or more embodiments, it is determined whether the to-be-bound device is connected to a designated wireless network; when the to-be-bound device is connected to the designated wireless network, it is sent to a server a binding request for binding with the to-be-bound device; where the binding request carries a registered user account and is configured to trigger the server to start a binding process within a preset time period, such that the server establishes a binding relationship between the registered user account and the to-be-bound device after the server receives a binding confirmation message sent by the to-be-bound device within the preset time period. Through the present disclosure, it may simplify the binding process, effectively avoid incorrect binding and thus improve the security in the device binding process.

Figure 14:
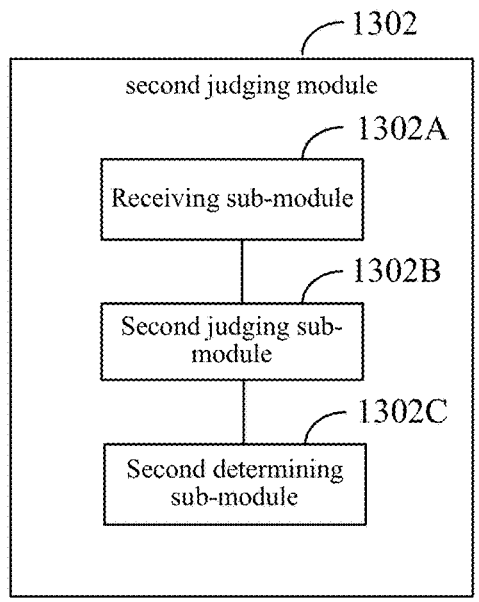
FIG. 14 is a block diagram illustrating another apparatus for binding with a device according to an exemplary embodiment.

FIG. 14 is a block diagram illustrating another apparatus for binding with a device according to an exemplary embodiment, based on the embodiment as shown in the above FIG. 13. When the binding request carries a unique identification of the to-be-bound device; the second determining module 1302 may include: a receiving sub-module 1302A, a second determining sub-module 1302B and a second determining sub-module 1303C.

The receiving sub-module 1302A is configured to receive a binding confirmation message sent by a device within the preset time period, the binding confirmation message carrying a unique identification of the device. The second determining sub-module 1302B is configured to determine whether the unique identification in the binding confirmation message is identical to the unique identification in the binding request. The second determining sub-module 1302C is configured to, if the unique identification in the binding confirmation message is identical to the unique identification in the binding request, determine that a binding confirmation message sent by the to-be-bound device is received within the preset time period.

Figure 15:
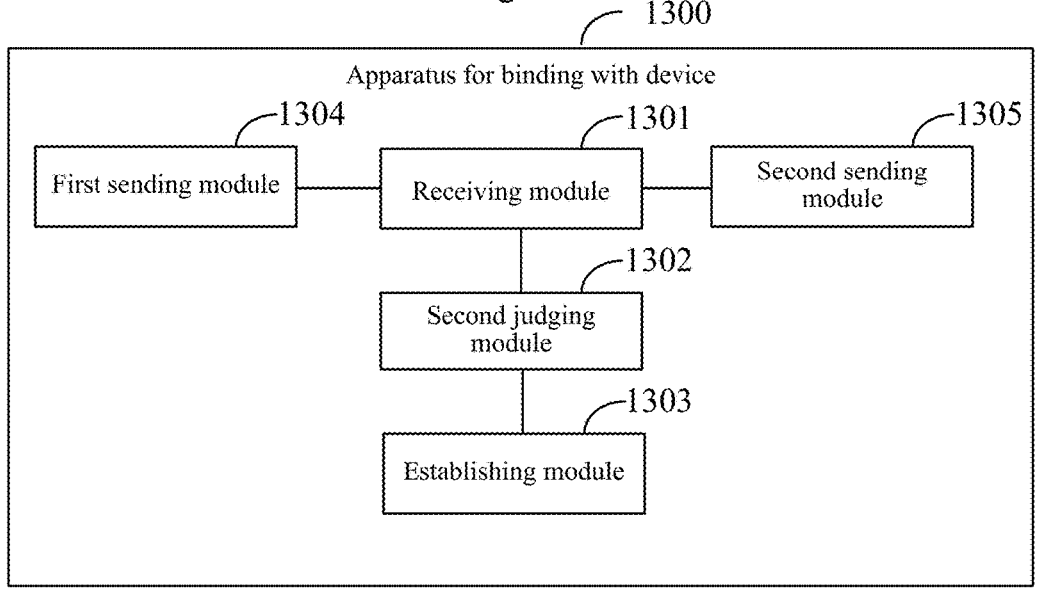
FIG. 15 is a block diagram illustrating another apparatus for binding with a device according to an exemplary embodiment.

FIG. 15 is a block diagram illustrating another apparatus for binding with a device according to an exemplary embodiment, based on the embodiment as shown in the above FIG. 13. The apparatus 1300 may further include: a first sending module 1304 and a second sending module 1305.

The first sending module 1304 is configured to, when a binding confirmation message sent by the to-be-bound device within the preset time period is received, send a notification message to the terminal for informing that the registered user account has been properly bound with the to-be-bound device. The second sending module 1305 is configured to, when no binding confirmation message sent by the to-be-bound device within the preset time period is received, send a notification message to the terminal for informing that the registered user account has not been properly bound with the to-be-bound device.

It should be noted that, first sending module 1304 and the second sending module 1305 above as shown in FIG. 15 may also be included in the apparatus according to one or more embodiments as shown in FIG. 14. This is not limited in the present disclosure.

Specific implementation of the operations and functions of the modules or units in the above devices may be referred to the implementation of corresponding steps in the above methods, which will not be repeated herein.

For the embodiments regarding apparatuses, since they correspond to the embodiments regarding methods, they may be referred to the description of the embodiments regarding methods. The embodiments regarding apparatuses described above are merely illustrative. The units described as separate components may be or may not be physically separate, and the components illustrated as a units may be or may not be physical units, and may be at the same location, or may be distributed to multiple units over the network. A part of or the whole of the modules may be selected to achieve the objective of the present disclosure as desired. One skilled in the art may understand and practice the embodiments without paying any creative labor.

Correspondingly, the present disclosure provides an apparatus for binding with a device, including: a processor; and a memory for storing instructions executable by the processor. The processor is configured to perform: determining whether the to-be-bound device is connected to a designated wireless network; and when the to-be-bound device is connected to the designated wireless network, sending to a server a binding request for binding with the to-be-bound device. The binding request carries a registered user account and is configured to trigger the server to start a binding process within a preset time period, such that the server establishes a binding relationship between the registered user account and the to-be-bound device after the server receives a binding confirmation message sent by the to-be-bound device within the preset time period.

Correspondingly, the present disclosure provides a terminal including a non-transitory computer-readable memory and one or more programs. The one or more programs may be stored in the memory, and one or more processors are configured to execute the one or more programs that contain instructions to cause the one or more processors to perform: determining whether the to-be-bound device is connected to a designated wireless network; and when the to-be-bound device is connected to the designated wireless network, sending to a server a binding request for binding with the to-be-bound device. The binding request carries a registered user account and is configured to trigger the server to start a binding process within a preset time period, such that the server establishes a binding relationship between the registered user account and the to-be-bound device after the server receives a binding confirmation message sent by the to-be-bound device within the preset time period.

Correspondingly, the present disclosure provides an apparatus for binding with a device, including: a processor; and a memory for storing instructions executable by the processor. The processor is configured to perform: receiving a binding request sent by a terminal for binding with the to-be-bound device; the binding request carrying a registered user account for triggering the apparatus to start a binding process within a preset time period; determining whether a binding confirmation message sent by the to-be-bound device is received within the preset time period. When a binding confirmation message sent by the to-be-bound device is received within the preset time period, establishing a binding relationship between the registered user account and the to-be-bound device.

Correspondingly, the present disclosure provides a sever including a memory and one or more programs. The one or more programs are stored in the memory, and one or more processors are configured to execute the one or more programs that contain instructions to cause the one or more processors to perform: receiving a binding request sent by a terminal for binding with the to-be-bound device; the binding request carrying a registered user account for triggering the apparatus to start a binding process within a preset time period; determining whether a binding confirmation message sent by the to-be-bound device is received within the preset time period. When a binding confirmation message sent by the to-be-bound device is received within the preset time period, establishing a binding relationship between the registered user account and the to-be-bound device.

Figure 16:
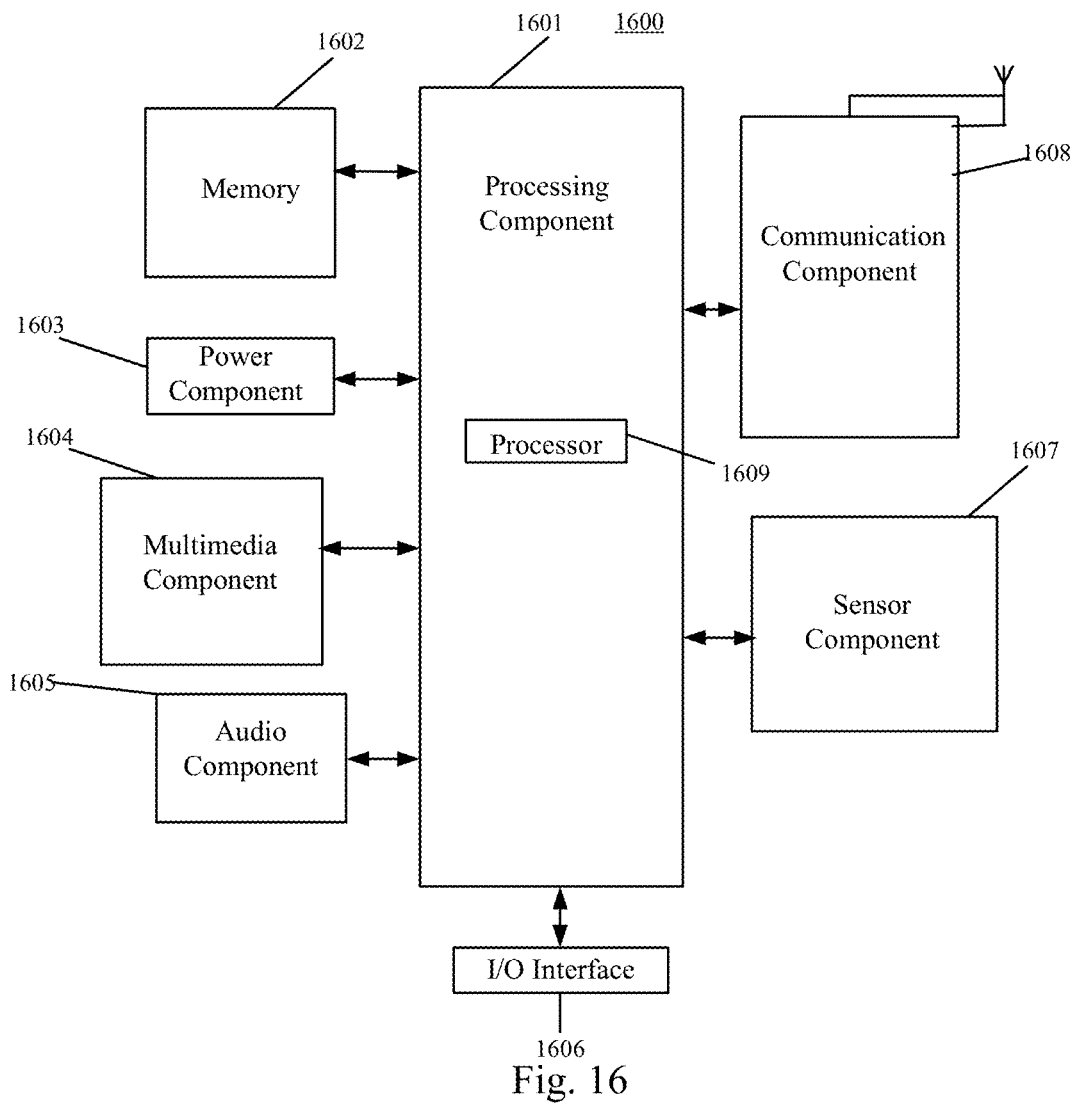
FIG. 16 is a block diagram illustrating an apparatus for binding with a device according to an exemplary embodiment.

FIG. 16 is a block diagram of an apparatus for binding with a device according to an exemplary embodiment.

As shown in FIG. 16 is an apparatus 1600 for interacting with a button according to an exemplary embodiment. For example, the apparatus 1600 may be a mobile phone, a computer, a digital broadcast terminal, a messaging device, a gaming console, a tablet, a medical device, exercise equipment, a personal digital assistant, and the like.

Referring to FIG. 16, the apparatus 1600 may include one or more of the following components: a processing component 1601, a memory 1602, a power component 1603, a multimedia component 1604, an audio component 1605, an input/output (I/O) interface 1606, a sensor component 1607, and a communication component 1608.

The processing component 1601 typically controls overall operations of the apparatus 1600, such as the operations associated with display, telephone calls, data communications, camera operations, and recording operations. The processing component 1601 may include one or more processors 1609 to execute instructions to perform all or part of the steps in the above described methods. Moreover, the processing component 1601 may include one or more modules which facilitate the interaction between the processing component 1601 and other components. For instance, the processing component 1601 may include a multimedia module to facilitate the interaction between the multimedia component 1604 and the processing component 1601.

The memory 1602 is configured to store various types of data to support the operation of the apparatus 1600. Examples of such data include instructions for any applications or methods operated on the apparatus 1600, contact data, phonebook data, messages, pictures, video, etc. The memory 1602 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1603 provides power to various components of the apparatus 1600. The power component 1603 may include a power management system, one or more power sources, and any other components associated with the generation, management, and distribution of power in the apparatus 1600.

The multimedia component 1604 includes a screen providing an output interface between the apparatus 1600 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1604 includes a front camera and/or a rear camera. The front camera and the rear camera may receive an external multimedia datum while the apparatus 1600 is in an operation mode, such as a photographing mode or a video mode. Each of the front camera and the rear camera may be a fixed optical lens system or have focus and optical zoom capability.

The audio component 1605 is configured to output and/or input audio signals. For example, the audio component 1605 includes a microphone ("MIC") configured to receive an external audio signal when the apparatus 1600 is in an operation mode, such as a call mode, a recording mode, and a voice recognition mode. The received audio signal may be further stored in the memory 1602 or transmitted via the communication component 1608. In some embodiments, the audio component 1605 further includes a speaker to output audio signals.

The I/O interface 1606 provides an interface between the processing component 1601 and peripheral interface modules, such as a keyboard, a click wheel, buttons, and the like. The buttons may include, but are not limited to, a home button, a volume button, a starting button, and a locking button.

The interface 1607 includes one or more sensors to provide status assessments of various aspects of the apparatus 1600. For instance, the interface 1607 may detect an open/closed status of the apparatus 1600, relative positioning of components, e.g., the display and the keypad, of the apparatus 1600, a change in position of the apparatus 1600 or a component of the apparatus 1600, a presence or absence of user contact with the apparatus 1600, an orientation or an acceleration/deceleration of the apparatus 1600, and a change in temperature of the apparatus 1600. The interface 1607 may include a proximity sensor configured to detect the presence of nearby objects without any physical contact. The interface 1607 may further include a light sensor, such as a CMOS or CCD image sensor, for use in imaging applications. In some embodiments, the interface 1607 may further include an accelerometer sensor, a gyroscope sensor, a magnetic sensor, a pressure sensor, or a temperature sensor.

The communication component 1608 is configured to facilitate communication, wired or wirelessly, between the apparatus 1600 and other devices. The apparatus 1600 may access a wireless network based on a communication standard, such as WiFi, 2G, or 3G, or a combination thereof. In one exemplary embodiment, the communication component 1608 receives a broadcast signal or broadcast associated information from an external broadcast management system via a broadcast channel. In one exemplary embodiment, the communication component 1608 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 1600 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods. Each module, unit, or sub-module, such as discussed with respect to FIGS. 8-12, may take the form of a packaged functional hardware unit designed for use with other components, a portion of a program code (e.g., software or firmware) executable by the processor 1609, the processing component 1601, or the processing circuitry that usually performs a particular function of related functions, or a self-contained hardware or software component that interfaces with a larger system, for example.

In exemplary embodiments, there is also provided a non-transitory computer-readable storage medium including instructions, such as included in the memory 1602, executable by the processor 1609 in the apparatus 1600, for performing the above-described methods. For example, the non-transitory computer-readable storage medium may be a ROM, a RAM, a CD-ROM, a magnetic tape, a floppy disc, an optical data storage device, and the like.

When instructions in the storage medium are executed by a processor of a mobile terminal, the mobile terminal is enabled to perform a method for interacting with a button, including: determining whether the to-be-bound device is connected to a designated wireless network; and when the to-be-bound device is connected to the designated wireless network, sending to a server a binding request for binding with the to-be-bound device. The binding request carries a registered user account and is configured to trigger the server to start a binding process within a preset time period, such that the server establishes a binding relationship between the registered user account and the to-be-bound device after the server receives a binding confirmation message sent by the to-be-bound device within the preset time period.

Correspondingly, the present disclosure provides an apparatus for binding with a device, including: a processor; and a memory for storing instructions executable by the processor. The processor is configured to perform: receiving a binding request sent by a terminal for binding with the to-be-bound device; the binding request carrying a registered user account for triggering the apparatus to start a binding process within a preset time period; determining whether a binding confirmation message sent by the to-be-bound device is received within the preset time period. When a binding confirmation message sent by the to-be-bound device is received within the preset time period, establishing a binding relationship between the registered user account and the to-be-bound device.

Figure 17:
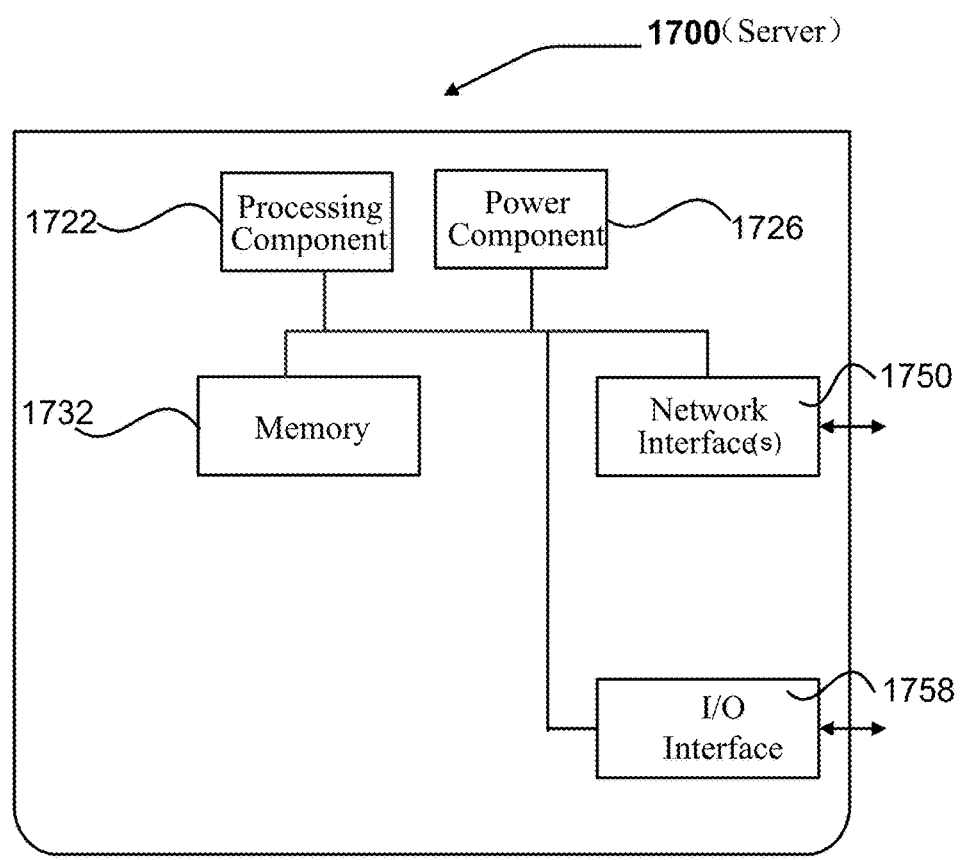
FIG. 17 is a block diagram illustrating another apparatus for binding with a device according to an exemplary embodiment.

FIG. 17 is a block diagram of an apparatus 1700 for binding with a device according to an exemplary embodiment. For example, the apparatus 1700 may be provided as a server. Referring to FIG. 17, the apparatus 1700 includes a processing component 1722 that further includes one or more processors, and memory resources represented by a memory 1732 for storing instructions executable by the processing component 1722, such as application programs. The application programs stored in the memory 1732 may include one or more modules each corresponding to a set of instructions. Further, the processing component 1722 is configured to execute the instructions to perform the above described method for binding with a device. Each module, unit, or sub-module, such as discussed with respect to FIGS. 13-15, may take the form of a packaged functional hardware unit designed for use with other components, a portion of a program code (e.g., software or firmware) executable by the processing component 1722, or the processing circuitry that usually performs a particular function of related functions, or a self-contained hardware or software component that interfaces with a larger system, for example.

The apparatus 1700 may also include a power component 1726 configured to perform power management of the apparatus 1700, wired or wireless network interface(s) 1750 configured to connect the apparatus 1700 to a network, and an input/output (I/O) interface 1758. The apparatus 1700 may operate based on an operating system stored in the memory 1732, such as Windows Server™, Mac OS X™, Unix™, Linux™, FreeBSD™, or the like.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes may be made without departing from the scope thereof. It is intended that the scope of the invention only be limited by the appended claims.

What is claimed is:

1. A method, comprising:
    determining, by a terminal, whether a device is connected to a designated wireless network; and
    when the device is connected to the designated wireless network, sending, by the terminal, to a server a binding request for binding a user account with the device;
    triggering the server to start a binding process within a preset time period by the binding request that carries a registered user account;
    establishing, by the server, a binding relationship between the registered user account and the device after the server receives a binding confirmation message sent by the device within the preset time period; and
    starting, by the server, time counting after receiving the binding request from the terminal, wherein the binding confirmation message comprises a first unique identification that matches a second unique identification included in the binding request, wherein both the binding request and the binding confirmation message are received by the server, and the first unique identification associates the binding confirmation message with the binding request when the first unique identification in the binding confirmation message is identical to the second unique identification in the binding request.

2. The method of claim 1, wherein before determining whether the device is connected to the designated wireless network, the method further comprises:
    designating a wireless network for the device based on user setting; and
    when receiving an instruction for establishing a connection with the wireless network, pushing a name and a password of the wireless network to the device.

3. The method of claim 1, wherein determining whether the device is connected to the designated wireless network comprises:
    determining whether a notification message is received for informing that the device is connected to the designated wireless network; and
    when the notification message is received for informing that the device is connected to the designated wireless network, determining that the device is connected to the designated wireless network.

4. The method of claim 1, further comprising:
    when the device is connected to the designated network, presenting a prompt message for prompting a user to press a binding confirmation button within the preset time period; wherein after the binding confirmation button is pressed, the device is triggered to send the binding confirmation message to the server, and wherein the binding relationship enables the terminal to operate the device using the registered user account in a smart home environment.

5. The method of claim 1, further comprising:
    when receiving a notification message sent by the server for informing that the registered user account has been properly bound with the device, presenting a prompt message to a user for informing that the binding relationship has been properly established; and
    when receiving a second notification message sent by the server for informing that the registered user account fails to be bound with the device, presenting, in a preset device-list interface at a position corresponding to the device, an option for the user to prompt the user to bind with the device for another time.

6. A method, comprising:
    receiving, by a server, a binding request sent by a terminal for binding a user account with a device determined to be connected to a designated wireless network; the binding request carrying the user account and triggering the server to start a binding process within a preset time period, wherein the server starts time counting after receiving the binding request from the terminal;
    determining, by the server, whether a binding confirmation message sent by the device is received within the preset time period; and
    when the binding confirmation message sent by the device is received within the preset time period and the binding confirmation message comprises a first unique identification that matches a second unique identification included in the binding request, wherein both the binding request and the binding confirmation message are received by the server, and the first unique identification associates the binding confirmation message with the binding request when the first unique identification in the binding confirmation message is identical to the second unique identification in the binding request, establishing, by the server, a binding relationship between the user account and the device.

7. The method of claim 6, wherein the binding request carries a unique identification of the device; and wherein determining whether the binding confirmation message sent by the device is received within the preset time period comprises:
receiving the binding confirmation message sent by the device within the preset time period, the binding confirmation message carrying the unique identification of the device;
determining whether the first unique identification in the binding confirmation message is identical to the second unique identification in the binding request;
when the first unique identification in the binding confirmation message is identical to the second unique identification in the binding request, determining that the binding confirmation message sent by the device is received within the preset time period.

8. The method of claim 6, further comprising:
when receiving the binding confirmation message sent by the device within the preset time period, sending a notification message to the terminal for informing that the user account has been properly bound with the device; and
when receiving no binding confirmation message sent by the device within the preset time period, sending a notification message to the terminal for informing that the user account has not been properly bound with the device.

9. An apparatus, comprising:
a processor; and
a memory for storing instructions executable by the processor;
wherein the processor is configured to perform:
determining whether a device is connected to a designated wireless network;
when the device is connected to the designated wireless network, sending to a server a binding request for binding a user account with the device; and
using the binding request that carries the user account to trigger the server to start a binding process within a preset time period, such that the server establishes a binding relationship between the user account and the device when the server receives a binding confirmation message sent by the device within the preset time period, wherein the server starts time counting after receiving the binding request from the terminal, and the binding confirmation message comprises a first unique identification that matches a second unique identification included in the binding request, wherein both the binding request and the binding confirmation message are received by the server, and the first unique identification associates the binding confirmation message with the binding request when the first unique identification in the binding confirmation message is identical to the second unique identification in the binding request.

10. The apparatus of claim 9, wherein before determining whether the device is connected to the designated wireless network, the apparatus further comprises:
designating a wireless network for the device based on user setting; and
when receiving an instruction for establishing a connection with the wireless network, pushing a name and a password of the wireless network to the device.

11. The apparatus of claim 9, wherein determining whether the device is connected to the designated wireless network comprises:
determining whether a notification message is received for informing that the device is connected to the designated wireless network; and
when the notification message is received for informing that the device is connected to the designated wireless network, determining that the device is connected to the designated wireless network.

12. The apparatus of claim 9, wherein the processor is further configured to perform:
when the device is properly connected to the designated network, presenting a prompt message for prompting a user to press a binding confirmation button within the preset time period; wherein after the binding confirmation button is pressed, the device is triggered to send the binding confirmation message to the server.

13. The apparatus of claim 9, wherein the processor is further configured to perform:
when receiving a notification message sent by the server for informing that the user account has been properly bound with the device, presenting a prompt message to a user for informing that the binding has been properly established; and
when receiving a second notification message sent by the server for informing that the user account fails to be bound with the device, presenting, in a preset device-list interface at a position corresponding to the device, an option for the user to prompt the user to bind with the device for another time.

14. An apparatus, comprising:
a processor; and
a memory for storing instructions executable by the processor;
wherein the processor is configured to perform:
receiving a binding request sent by a terminal for binding a user account with a device determined to be connected to a designated wireless network; the binding request carrying the user account and triggering the apparatus to start a binding process within a preset time period, wherein the server starts time counting after receiving the binding request from the terminal;
determining whether a binding confirmation message sent by the device is received within the preset time period; and
when the binding confirmation message sent by the device is received within the preset time period and the binding confirmation message comprises a first unique identification that matches a second unique identification included in the binding request, and when both the binding request and the binding confirmation message are received by the server, and the first unique identification associates the binding confirmation message with the binding request when the first unique identification in the binding confirmation message is identical to the second unique identification in the binding request, establishing a binding relationship between the user account and the device.

15. The apparatus of claim 14, wherein the binding request carries a unique identification of the device;
determining whether the binding confirmation message sent by the device is received within the preset time period comprises:

receiving the binding confirmation message sent by the device within the preset time period, the binding confirmation message carrying the unique identification of the device;
determining whether the first unique identification in the binding confirmation message is identical to the second unique identification in the binding request;
when the first unique identification in the binding confirmation message is identical to the second unique identification in the binding request, determining that the binding confirmation message sent by the device is received within the preset time period.

16. The apparatus of claim 14, wherein the processor is further configured to perform:
when receiving the binding confirmation message sent by the device within the preset time period, sending a notification message to the terminal for informing that the user account has been properly bound with the device;
when receiving no binding confirmation message sent by the device within the preset time period, sending a notification message to the terminal for informing that the user account has not been properly bound with the device.

17. A non-transitory computer-readable storage medium storing instructions that, when being executed by a processor of a terminal, cause the terminal to perform:
determining whether the device is connected to a designated wireless network;
when the device is connected to the designated wireless network, sending to a server a binding request for binding with the device; and
using the binding request that carries a user account to trigger the server to start a binding process within a preset time period, such that the server establishes a binding relationship between the user account and the device after the server receives a binding confirmation message sent by the device within the preset time period, wherein the server starts time counting after receiving the binding request from the terminal, and the binding confirmation message comprises a first unique identification that matches the second unique identification included in the binding request, wherein both the binding request and the binding confirmation message are received by the server, and the first unique identification associates the binding confirmation message with the binding request when the first unique identification in the binding confirmation message is identical to the second unique identification in the binding request.

18. The non-transitory computer-readable storage medium of claim 17, wherein before determining whether the device is connected to the designated wireless network, the terminal is further caused to perform:
designating a wireless network for the device based on user setting; and
when receiving an instruction for establishing a connection with the wireless network, pushing a name and a password of the wireless network to the device.

19. A non-transitory computer-readable storage medium storing instructions that, when being executed by a processor of a server, cause the server to perform:
receiving a binding request sent by a terminal for binding with a device determined to be connected to a designated wireless network; the binding request carrying a user account for triggering the server to start a binding process within a preset time period, wherein the server starts time counting after receiving the binding request from the terminal;
determining whether a binding confirmation message sent by the device is received within the preset time period; and
when the binding confirmation message sent by the device is received within the preset time period, and the binding confirmation message comprises a first unique identification that matches the second unique identification included in the binding request, wherein both the binding request and the binding confirmation message are received by the server, and the first unique identification associates the binding confirmation message with the binding request when the first unique identification in the binding confirmation message is identical to the second unique identification in the binding request, establishing a binding relationship between the user account and the device.

20. The non-transitory computer-readable storage medium of claim 19, wherein the binding request carries a unique identification of the device;
determining whether the binding confirmation message sent by the device is received within the preset time period comprises:
receiving the binding confirmation message sent by the device within the preset time period, the binding confirmation message carrying a unique identification of the device;
determining whether the first unique identification in the binding confirmation message is identical to the second unique identification in the binding request;
if the first unique identification in the binding confirmation message is identical to the second unique identification in the binding request, determining that the binding confirmation message sent by the device is received within the preset time period.

* * * * *